Nov. 16, 1954  A. GELARDIN  2,694,772
FLASHLIGHT WITH HERMETICALLY SEALED CASING
Filed Dec. 14, 1949
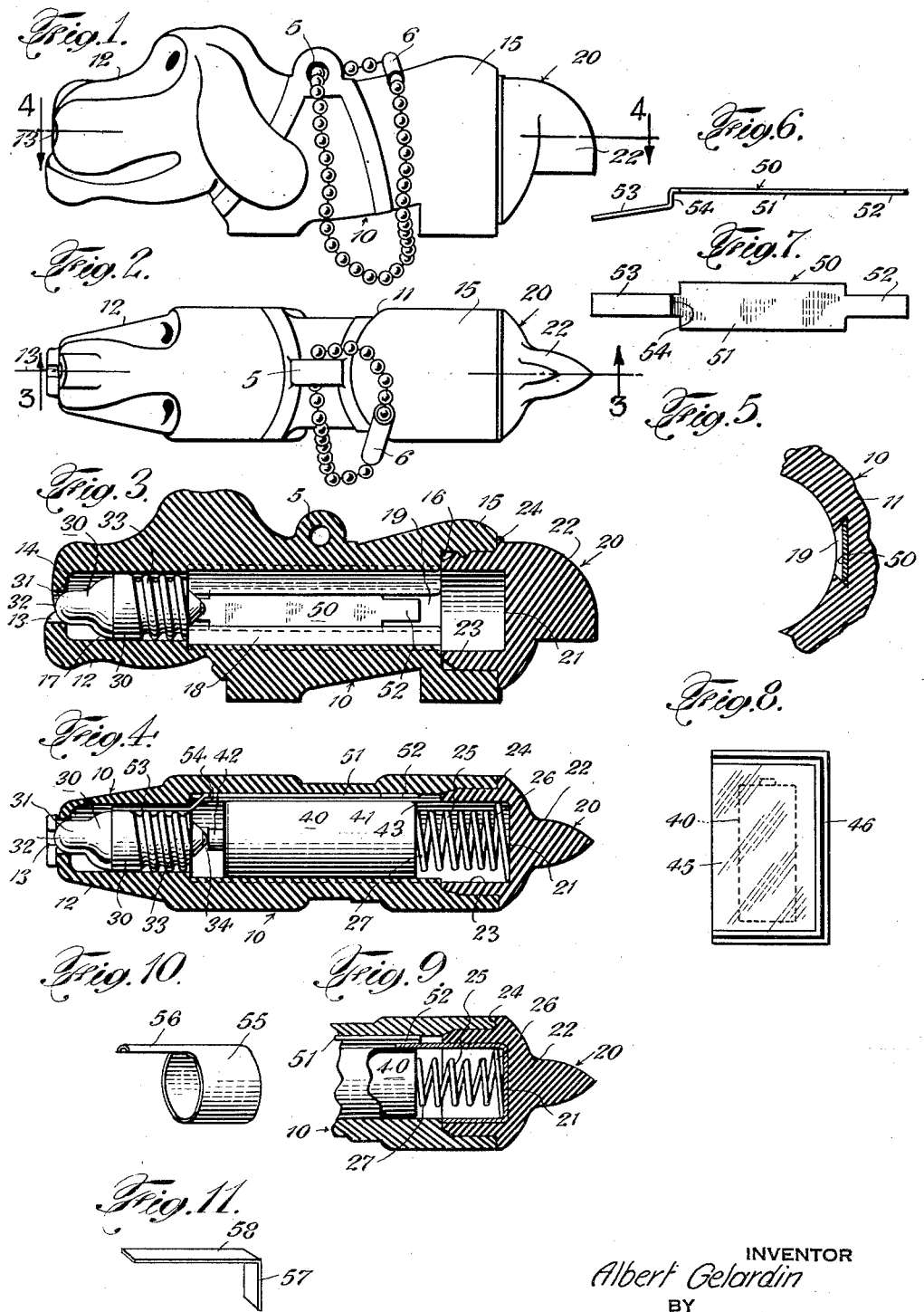
INVENTOR
Albert Gelardin
BY
Frederick A. Norton
ATTORNEY 2,694,772
FLASHLIGHT WITH HERMETICALLY SEALED CASING Albert Gelardin, New York, N. Y.

Application December 14, 1949, Serial No. 132,854

3 Claims. (Cl. 240—6.4)

This invention relates to a method and means for improving the life of miniature dry cells while stored, and when incorporated in self-sealing miniature flashlights having internal switch mechanisms operable by inward flexure of a selected portion of the flashlight casing, and to such flashlights.

Miniature flashlights are powered by dry cells which are substantially half the size of the small, "penlite" cell. Owing to the severly reduced bulk of miniature dry cells, the volume of water available to activate the cells is restricted. Evaporation of water through the porous carbon electrodes and the sealing compound takes place at the same rate as in larger cell units. However, because of their minimum size, miniature cells are much more quickly rendered inoperative by the loss of water from the electrolyte, no matter whether the cells are in use in flashlights, or are stored, than are standard size cells. The shortened shelf-like and use life of miniature cells has been an effective deterrent to the practical use of these cells in miniature flashlights and installations where space limitations are controlling.

I have now found that the disadvantages of short shelf life, and short active or use life of miniature cells are effectively obviated by maintaining the miniature dry cells hermetically sealed at all times, both during storage, and while incorporated as the power elements of miniature flashlights or other installations. I have found that the shelf or storage life of miniature dry cells can be rendered maximum by packaging the cells in hermetically sealed packages, such as heat-sealed sheet plastic envelopes, and desirably in the presence of an inert gas, under slight pressure.

To insure optimum operative life of miniature dry cells, the invention herein also comprehends the use of a novel flashlight having no elements projecting through its casing, and one which is hermetically sealed, thereby insuring optimum retention of water in the cell electrolyte, due to the elimination of any chance of evaporation of water from a cell to the ambient atmosphere.

The novel flashlight herein is characterized by the elimination of all switch elements from the exterior of the casing or body, and the seating of the lamp and apposed cell in coaxial chambers formed as a hollow interior of the casing. The cell is biased against the lamp base by a coil spring mounted in a removable plug which serves as an end closure for the flashlight casing. In one form, the wholly enclosed switch mechanism is a simple, unitary strip of spring metal, such as half-hard spring brass, having a flat body with an end section of reduced width, and an offset head piece, also of reduced width. The inner wall of the flashlight casing is provided with a bilaterally undercut groove in which the body of the switch is seated and gripped. The offset lamp contact section of the switch extends up out of the groove and into the lamp socket formed at the forward end of the flashlight casing. The groove seating the body of the switch and its narrow end section extends the length of the battery chamber. Because of its reduced width, the end section of the switch can be flexed out of the groove and into circuit closing contact with the bare cell wall, by pinching the body of the casing in that section.

In a second form, a conductive metal strip or ferrule is mounted in the removable plug, extending to a position opposite the flexible switch strip in the body of the flashlight and apposable by the flexed switch strip to close the lamp circuit.

The flashlight casing is made of rubber-like plastic, the compound being of any suitable formulation, and possessed of only sufficient elasticity to permit the pinching of the walls in the relatively thin area of the tail piece of the switch. Using a molded elastomeric plastic flashlight casing, the necessary rigidity and strength are easily obtained without recourse to metal inserts or casing sections. Additionally, the outer surface of the flashlight casing can be configured to any desired design, such as a dog, as illustrated in the drawings. The insulating casing, in its preferred form, as noted, is of molded elastomeric polymer having the necessary structural rigidity in the finished article. Cold cure compound, incorporating organic peroxides, and the like, may be cast in molds, and hot cure (vulcanizable) compounds can be formed in platen presses or injection molded.

It is, therefore, a feature of novelty and advantage of the present invention to provide hermetically sealed packages and flashlights for storing and using miniature dry cells which are normally subject to deleterious evaporative losses when exposed to the ambient air, whether packaged in the usual containers, or incorporated in ordinary flashlight casings.

It is also among the features of novelty and advantage of the present invention to provide a flashlight having a normally rigid casing and end closure of material having the characteristics of semi-vulcanized rubber, the casing and closure forming a unitary two-piece hermetic housing for the lamp and cell, and incorporating a wholly enclosed and sealed switch mechanism.

Other and desirable features of novelty and advantage include a hermetically sealed flashlight devoid of external or projecting switch elements, and having its components held in mutual cooperative inter-engagement by the friction locking grip of the elastic casing elements.

Further features of novelty and advantage include special switch elements in the casing wall, and cooperating elements in the removable plug or end closure.

The above and other desirable features of novelty and advantage of the present invention will be more clearly understood by referring to the accompanying drawings, in which a preferred embodiment of the invention is illustrated, and in which like numerals refer to similar parts through the several views, in which Figures 1 and 2 are, respectively, a side elevation and a top plan view of the improved flashlight herein;

Fig. 3 is a longitudinal section of the flashlight casing, taken on line 3—3 of Fig. 2, showing the mounting of the lamp and switch;

Fig. 4 is a longitudinal section of the flashlight casing, taken on line 4—4 of Fig. 1, and showing the assembly of the lamp, battery and switch in mutual cooperative relationship;

Fig. 5 is a detailed section of the casing wall showing the mounting of the switch;

Figs. 6 and 7 are, respectively, edge and plan views of the switch;

Fig. 8 is an elevation of a hermetically sealed plastic envelope enclosing a miniature dry cell, shown in dotted lines;

Fig. 9 is a longitudinal section of the plug end of the flashlight casing, showing a cell in elevation and an auxiliary switch element mounted in the plug and having a tip portion in conductive contact with the cell, and Figs. 10 and 11 are elevations of auxiliary switch elements, as shown in Fig. 9.

Referring more particularly to the drawings, the novel flashlight comprises a two part casing, made up of a generally hollow body portion 10, and an end closure or plug 20 hermetically fitted therein and sealing one end. Mounted in the body portion 10 are a lamp 30, dry cell 40, switch 50, and biasing spring 25. The casing body 10 comprises a relatively stiff wall 11, a semi-rigid front end 12, including a lamp-receiving aperture 13 with a flexible inner edge 14, and a semi-rigid annular rear end 15 having an inner shoulder 16. The inner surface of the member 10 is configured to provide a lamp-receiving socket 17 and a central, battery-receiving section 18. The central section 18, as shown in Fig. 5, is provided with a bilaterally undercut groove 19, adapted to receive and grip the body portion 51 of switch 50 in sliding, locking engagement. The plug 20 is generally cup-shaped, with a relatively stiff base 21 having an extension 22, serving as a gripping piece for the manipulation of the plug. The cup portion 23 of the end piece is relatively flexible, and is adapted to fit in and engage the inner wall of body section 15 in frictional, locking engagement. To insure positive friction grip between body section 15 and end plug 23, the latter is made slightly oversize, whereby a driving, force fit is assured when it is introduced into the rear end of the casing body. The end plug 20 is provided with a shouldered flange 24 adapted to seat against the rear end of annular section 15 of the casing body. The biasing spring 25 is spiral, as shown, and is formed with a base, or first turn 26, which is greater in diameter than the cup section 23 of the end plug, whereby the spring 25 is locked in position in the end plug by the spring-biasing action of its first turn or coil 26, which is seated against the base of the cup, which base is essentially an integral part of the relatively stiff base 21 of the end plug. In its extended position, the terminal coil or last turn 27, of spring 25, extends well into the interior of casing 10, when the end plug is seated in closing position. With the lamp 30 and cell 40 seated in proper position in the casing, the spring 25 will be compressed when plug or end closure 20 is seated in place, and cell 40 will be spring-biased against the lamp, with its cathode in positive engagement with the base contact of the lamp.

As shown in Figs. 9 and 10, an auxiliary contact member or switching element, comprises a ferrule 55 with an extension or contact piece 56. The ferrule 55, which may be split, is mounted in the end plug 20, in friction tight fit. When the closure 20 is forced into its normal, seated position in the casing 10, the finger or extension 56 of the ferrule will extend on and over the wall of cell 40. The extension 56 will overlie groove 19, in the casing wall, and will be apposed by switch section 52, when the latter is flexed inwardly, whereby the lamp circuit will be energized. With this construction, positive, circuit closing contact of switch element 52 is assured every time it is flexed inwardly. A second form of auxiliary contact member is shown in Fig. 11, and comprises an L-shaped strip of brass, or the like, having a base 57 and leg or finger 58. When this form is used, it is inserted in the end plug, and the spring 25 is forced in place, whereby the base 57 of the strip is clamped and held in place. The leg or finger 58 is of sufficient length to overlie the wall of cell 40, and be contacted by switch section 52 when the latter is flexed into circuit closing position.

The lamp 30 comprises a bulb 31 having a focusing tip 32 spirally threaded, as shown, and a central or base contact 34. The lamp body is adapted for friction drive fit in and against the casing wall section 17, with the bulb tip 32 seated in force fit against the yieldable inner edge 14 of aperture 13 of the casing, thereby insuring hermetic sealing of the lamp aperture. The cell 40 is of usual construction, comprising a zinc cup or casing 41 receiving as an anode, and a central cathode having a magnetic terminal cap 42. The cell 40 is fitted in the body of the casing in loose fit and is spring-biased by spring 25 of the tail piece or end closure, whereby terminal 42 of the cell is positively maintained in circuit closing contact with terminal 34 of the lamp.

The improved switching mechanism herein will now be described. As shown in Figs. 6 and 7, the switch 50 comprises a flat strip of metal, having a body portion 51 of uniform width, a rear flexible contact portion 52 of reduced width, and a forward contact strip 53 offset inwardly as indicated at 54, this strip also being of lesser width than the body portion 51. The contact strip 53 is bent inwardly at an angle to insure positive contact-making bearing engagement against the ferrule of the lamp. The switch, as shown in Figs. 3, 4 and 5, is mounted in the bilaterally undercut groove 19 of the wall 11 of casing 10 in such a manner that the sides of body section 51 of the flat strip are held in sliding, gripping engagement by the inturned edges or undercuts of groove 19. In mounting the switch, the lamp 30 being removed, the strip 50 is slid into the groove 19 forwardly until stopped by the abutment or engagement of offset 54 against the rear edge of the restricted lamp housing or section 17 of the casing. The contact strip 53 will extend well into the socket 17, with its terminal tip biased toward the axis thereof. When the lamp 30 is introduced into the casing and pushed forwardly in drive fit in socket 17, with the tip or focus end 32 of the lamp bulb having gripping fitted engagement with the flexible edge 14 of lamp aperture 13, the contact strip 53 will be forced outwardly against the wall of the socket by ferrule 33 of the lamp, thereby establishing positive conductive contact with one side of the bulb filament, the other side of the filament being connected to terminal 34. The free end 52 of the switch strip is seen to be narrower than the slot formed by the lips of undercut groove 19, so that when the casing is squeezed in the area approximating section 52 of the switch, the latter is flexed inwardly against zinc cup 41, establishing positive contact and closing the lamp circuit.

The flashlight herein is simple in construction and permits the economical use of midget batteries by insuring the hermetic sealing of the flashlight casing so that there is no opportunity for the rapid elimination of water vapor from the cell, even under conditions of prolonged battery use, and, therefore, maximum gas generation, or when the ambient air temperature is excessive. The positive sealing of the switch mechanism wholly within the casing prevents leakage of air due to the fact that no apertures are required in the wall of the flashlight casing to permit normal operation of the switch.

The novel flashlight is especially adapted for fabrication of novelty objects, in which the casing is molded or otherwise fashioned to simulate various articles. Additionally, by incorporating an apertured lug or ear 5 as part of the exterior of the casing, and fitting a key chain 6 therethrough, the miniature flashlight herein is especially adapted for women's use, serving to carry also keys and the like, and, because of its small size, fitting into the smallest of purses.

As intimated hereinabove, a special feature of the present invention is the discovery that difficulties incident to the prior use, or attempted use of miniature dry cells and the like, was not too successful because of the deleterious effect attendant upon the loss of water in an amount which would be of slight consequence in the case of the standard dry cells of various sizes, but which in the case of the miniature cells involved herein, was sufficient to render the cell useless. This critical disadvantage is overcome by the discovery, recited herein, of the fact that hermetically sealing miniature batteries in packages for storage and sale, and in self-sealing flashlights, locks in the vital water of the electrolyte by preventing any discharge of water or water vapor to the ambient atmosphere. As illustrated in Fig. 8, a miniature dry cell 40 is desirably packaged in a plastic envelope 45, having a marginal heat seal 46 around three edges thereof, as shown. The envelope 45 may be made of any suitable thermo plastic material, and desirably of transluscent or transparent sheet plastic. Packages of the type illustrated in Fig. 8 can be fabricated and filled automatically on continuous machines, available on the market, and at very low cost.

It will now be apparent that there has been provided novel miniature flashlights using miniature dry cells wherein the cells are maintained hermetically sealed, not only during use in the flashlight, thereby prolonging their life, but also by being packaged in hermetically sealed plastic envelopes or like packages, whereby the shelf life of the dry cells is greatly prolonged.

What is claimed is:

1. A flashlight comprising a flexible tubular rubber-like flashlight casing having a restricted lamp opening at one end; a lamp fitted in the opening and hermetically sealing the opening; an elastomeric end closure for the casing adapted to hermetically seal the casing; a battery in the casing; switch means to connect the battery in circuit with the bulb, spring biasing means abutting the end closure and battery to permanently bias the cathode of the battery in conductive, bearing engagement against the center contact of the lamp, the said switch comprising a bendable resilient thin flat metal strip mounted in a groove in the casing, having the same width as the bottom of the groove, and having an offset front end in fixed contact with the ferrule of the lamp, the rear end of the switch being adapted to be flexed inwardly against the cup of the battery by pressing the adjacent wall of the flashlight casing, whereby the lamp circuit is closed and the lamp lighted, the rear end of the switch being of reduced width, whereby to clear the groove mounting the switch when the flashlight casing is pressed inwardly thereagainst.

2. An elongated sealed flashlight-key chain structure having a tubular elastic cylindrical body with an open mouth at one end and a closed bottom with a central axial opening at the other end, an electric light lamp bulb with a metal screw base and with an end connection inserted into said body, said lamp having a narrowed bulb extension nipple fitting into said central opening and sealing the same, a small cylindrical dry cell next inserted into said body with a metal cup and a central top end connection contacting said bulb end connection, a plug with an inside socket fitted into said open mouth, a coil spring fitted into said socket and reacting against the metal cup and pressing said end connections together, the interior of said cylindrical body having a dovetail groove, a metal strip closely fitting in said groove and having the same width as the bottom of the groove and having reduced width end projections of less width than the top of the groove so that they may be projected out of said groove into contact with the metal cup and the screw base and close the circuit through the lamp and the battery.

3. The structure of claim 2, one of said end projections being permanently bent out of the groove into contact with the screw base and the other of said end projections normally being positioned at the bottom of the groove and being forced out of said groove upon pressure on the cylindrical body outside thereof.

References Cited in the file of this patent

UNITED STATES PATENTS

| Number | Name | Date |
|---|---|---|
| D. 155,094 | Lewis | Sept. 6, 1949 |
| 932,841 | Andrews | Aug. 31, 1909 |
| 1,090,624 | Kaempfer | Mar. 17, 1914 |
| 2,019,884 | Beaumont | Nov. 5, 1935 |
| 2,166,282 | Benjafield | July 18, 1939 |
| 2,234,972 | Lennan | Mar. 18, 1941 |
| 2,387,144 | Gey | Oct. 16, 1945 |
| 2,431,518 | Stigler et al. | Nov. 25, 1947 |
| 2,483,819 | Falge | Oct. 4, 1949 |
| 2,483,820 | Falge | Oct. 4, 1949 |

FOREIGN PATENTS

| Number | Country | Date |
|---|---|---|
| 418,471 | Great Britain | Oct. 25, 1934 |
| 561,575 | Great Britain | May 24, 1944 |